United States Patent
Ramaswamy

(10) Patent No.: US 12,432,410 B2
(45) Date of Patent: *Sep. 30, 2025

(54) METHODS AND SYSTEMS FOR CONTENT SYNCHRONIZATION

(71) Applicant: Comcast Cable Communications, LLC, Philadelphia, PA (US)

(72) Inventor: Srinath V. Ramaswamy, East Windsor, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,894

(22) Filed: Nov. 16, 2021

(65) Prior Publication Data

US 2022/0239972 A1    Jul. 28, 2022

Related U.S. Application Data

(63) Continuation of application No. 16/387,213, filed on Apr. 17, 2019, now Pat. No. 11,228,799.

(51) Int. Cl.
| | |
|---|---|
| *H04N 21/43* | (2011.01) |
| *G06F 16/78* | (2019.01) |
| *G06F 16/783* | (2019.01) |
| *H04N 21/24* | (2011.01) |

(52) U.S. Cl.
CPC ..... *H04N 21/4307* (2013.01); *G06F 16/7834* (2019.01); *G06F 16/7867* (2019.01); *H04N 21/2404* (2013.01)

(58) Field of Classification Search
CPC .......... H04N 21/2404; H04N 21/4425; H04N 21/8547; H04N 21/43072; H04N 21/236; H04N 21/23605; H04N 21/2368; H04N 21/2389; H04N 21/23892; H04N 13/161; H04N 5/04; H04N 5/06; H04N 5/932; H04N 5/935; H04N 21/4302–4307; H04N 21/4305; H04N 21/4341; H04N 21/426; H04N 21/242; H04N 21/439; H04N 21/4392; H04N 21/4394; H04N 21/44; H04N 21/44004; H04N 21/44008; G06F 16/7834; G06F 16/7867

See application file for complete search history.

(56) References Cited

U.S. PATENT DOCUMENTS

| | | | | |
|---|---|---|---|---|
| 5,467,139 | A | * 11/1995 | Lankford | ............... H04N 7/56 375/E7.278 |
| 6,148,135 | A | * 11/2000 | Suzuki | ............... G11B 27/3027 386/E9.017 |
| 6,912,010 | B2 | 6/2005 | Baker et al. | |
| 10,158,927 | B1 | * 12/2018 | Lei | ............ H04N 21/233 |
| 2004/0105660 | A1 | * 6/2004 | Suzuki | ............... H04N 21/439 386/E5.052 |

(Continued)

FOREIGN PATENT DOCUMENTS

JP     5383520 B2    1/2014

*Primary Examiner* — John W Miller
*Assistant Examiner* — Humam M Satti
(74) *Attorney, Agent, or Firm* — Ballard Spahr LLP

(57) ABSTRACT

Methods and systems are described for content synchronization. A computing device may receive video content and audio content. The computing device may determine an error associated with a video content output time or an audio content output time.

28 Claims, 7 Drawing Sheets

(56) References Cited

U.S. PATENT DOCUMENTS

| | | |
|---|---|---|
| 2006/0098742 A1* | 5/2006 | Meenakshisundaram .................... H04N 21/43072 375/E7.199 |
| 2007/0092224 A1 | 4/2007 | Tsukagoshi et al. |
| 2007/0126929 A1* | 6/2007 | Han ................. H04N 21/43072 348/E5.009 |
| 2008/0304571 A1 | 12/2008 | Tsukagoshi et al. |
| 2009/0073316 A1 | 3/2009 | Ejima |
| 2009/0304082 A1* | 12/2009 | Radhakrishnan ... G06F 16/7834 375/240.15 |
| 2012/0120314 A1* | 5/2012 | Yang .................... H04N 17/004 348/E9.034 |
| 2013/0141643 A1 | 6/2013 | Carson et al. |
| 2014/0153909 A1 | 6/2014 | MacInnis et al. |
| 2014/0160351 A1 | 6/2014 | Ejima |
| 2015/0195425 A1 | 7/2015 | McRae |
| 2017/0092328 A1* | 3/2017 | Anderson ............... G11B 27/10 |
| 2017/0150141 A1 | 5/2017 | Yang et al. |
| 2017/0181113 A1 | 6/2017 | Keyser et al. |
| 2021/0219012 A1* | 7/2021 | Maurice ........... H04N 21/44008 |

\* cited by examiner

METHODS AND SYSTEMS FOR CONTENT SYNCHRONIZATION

CROSS REFERENCE TO RELATED PATENT APPLICATION

This application claims priority under 35 U.S.C. § 120 to, and is a continuation of, U.S. patent application Ser. No. 16/387,213, filed Apr. 17, 2019, the entire contents of which are hereby incorporated herein by reference in its entirety for all purposes.

BACKGROUND

The synchronization of the audio and video components of a content item are paramount to the experience of a user. Audio content and video content that are not synchronized may compromise a user's experience and may be perceived as low quality. In digital video, audio content and video content can be separated and independently decoded, processed, and played, resulting in many opportunities for the audio content and the video content to become out of sync.

SUMMARY

It is to be understood that both the following general description and the following detailed description are exemplary and explanatory only and are not restrictive. Methods and systems for content synchronization are described. A computing device may receive video content and/or audio content. The video content and/or the audio content may have an associated output (e.g., presentation) time, as well as data that indicates a difference between the video output (e.g., presentation) time and the audio output (e.g., presentation) time. The computing device may utilize the data to determine whether an error exists in the output time of the video content and/or audio content. The computing device may determine a corrected output (e.g., presentation) time of the video content and/or audio content. The computing device may also determine whether a time the video content is decoded is correct, and if not, correct the video decode time.

Additional advantages will be set forth in part in the description which follows or can be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
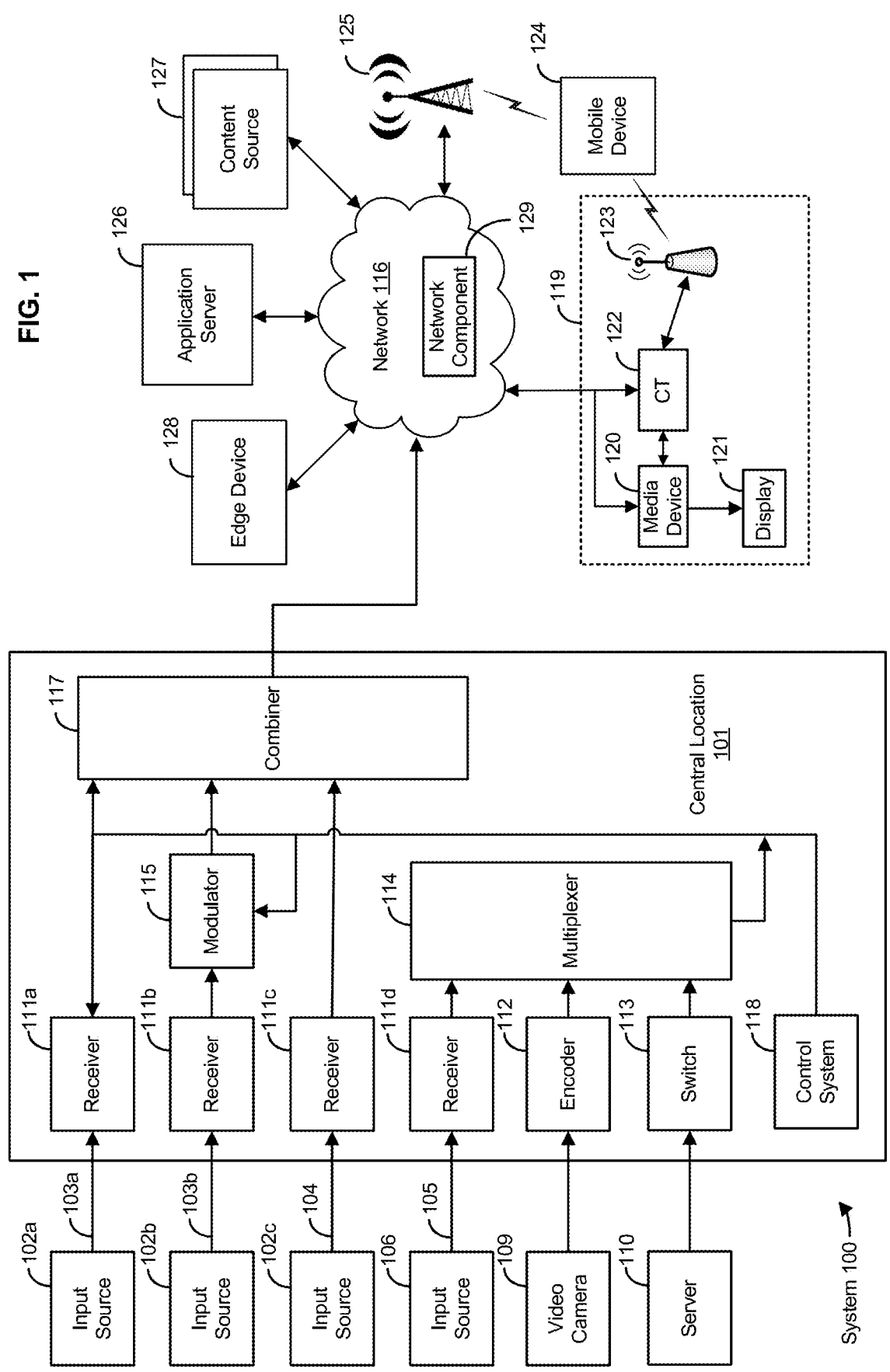
FIG. 1 shows an example system for content synchronization.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

This detailed description may refer to a given entity performing some action. It should be understood that this language may in some cases mean that a system (e.g., a computer) owned and/or controlled by the given entity is actually performing the action.

When audio/video content is displayed to user, the audio and video would ideally be properly synchronized to provide a high quality experience. In compressed or uncompressed video streams, video frames and audio frames include output (e.g., presentation, display, delivery, etc.) time stamps that the video decoders use for synchronized audio/video output (e.g., presentation, display, delivery, etc.). However, the output time stamps may have incorrect values due to a variety of reasons such as an encoding error or due to transmission errors or incorrect re-stamping of these output time stamps when the content is processed for transcoding or re-multiplexing. Thus, if a device receives the audio content and/or the video content with incorrect value(s) for the output time stamp(s) and does not correct the incorrect value(s), there will be a synchronization error between the audio content and the video content.

The audio content and video content may have metadata. The metadata may be inserted into every audio frame and every video frame. The metadata may be inserted into the audio frames and the video frames based on an interval. The metadata may be information associated with synchronizing the audio and video. The metadata may have an output (e.g., presentation, display, delivery, etc.) delta. The output delta may be represented as (DELTA_P[x][y]), where x is the video frame number and y is the audio frame number from a set of audio frames whose output (e.g., presentation, display, delivery, etc.) start overlaps with the x video frame output (e.g., presentation, display, delivery, etc.). To determine the output delta, a video frame may be identified. Any audio frames whose output (e.g., presentation, display, delivery, etc.) starts during the identified video frame's output may also be identified. There may be multiple audio frames that are associated with a single video frame. For each audio frame determined to start output during each video frame's output, the DELTA_P[x][y] value is the difference in the output time of y audio frame with that of the x video frame. Stated differently, DELTA_P[x][y]=AUDIO_OUTPUT_TIME[y]−VIDEO_OUTPUT_TIME[x].

Each video frame and audio frame may be assigned an identifier (ID). Each video frame may have an associated video frame ID. The video frame ID may be unique for each video frame. Each audio frame may have an associated audio frame ID. The audio frame ID may be unique for each audio frame. Each audio frame may also indicate any associated video frames. The audio frame may comprise metadata that indicates one or more video frames that the audio frame shares an output (e.g., presentation, display, delivery, etc.) time with. The metadata may comprise the video frame ID of the associated video frame. The associated video frame may be the video frame that the output of the video frame occurs concurrently with the audio frame.

The metadata may be inserted in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with an encoder and/or transcoder, such as a MPEG encoder and/or transcoder. The metadata may also be inserted at other stages in a content distribution network such as at a packager, at a cache device associated with the content distribution network, at an input to the client device, or by any device at any point along the content distribution.

The metadata may be extracted by a device. A synchronization error may be detected, and if necessary, appropriate corrections made to achieve proper synchronization between the video frames and the audio frames. The audio frames and the video frames may be communicated via one or more streams of content. The audio/video streams may require decrypting if encrypted to extract the metadata from an MPEG structures.

FIG. 1 shows an example system 100. Those skilled in the art will appreciate that the methods described herein may be used in systems that employ both digital and analog equipment. One skilled in the art will appreciate that provided herein is a functional description and that the respective functions may be performed by software, hardware, or a combination of software and hardware.

The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., location 119) via a network 116 (e.g., content distribution and/or access system).

The central location 101 may receive content from a variety of sources 102a, 102b, and 102c. The content may be sent from the source to the central location 101 via a variety of transmission paths, including wireless (e.g., satellite paths 103a, 103b) and a terrestrial path 104. The central location 101 may also receive content from a direct feed source 106 via a direct line 105. Other input sources may be capture devices such as a video camera 109 or a server 110. The signals provided by the content sources may include a single content item, a portion of a content item (e.g., content fragment, content portion, content section), a content stream, a plurality of content streams, a multiplex that includes several content items, and/or the like. The plurality of content streams may have different bitrates, framerates, resolutions, codecs, languages, and so forth. The signals provided by the content sources may be video frames and audio frames that have metadata. The metadata of the video frames and the audio frames may be used to determine, and correct if necessary, a synchronization error between the video frames and the audio frames.

The central location 101 may be one or a plurality of receivers 111a, 111b, 111c, 111d that are each associated with an input source. MPEG encoders such as encoder 112, are included for encoding local content or a video camera 109 feed. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by multiplexer (mux) 114.

Data may be inserted into the content at the central location 101 by a device (e.g., the encoder 112, the multiplexer 114, the modulator 115, and/or the combiner 117). The data may be metadata. The device may encode data into the content. The metadata may be inserted by the device in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with an encoder and/or transcoder, such as a MPEG encoder and/or transcoder. The metadata may also be inserted at other stages in a content distribution network such as at a packager, at a cache device associated with the content distribution network, at an input to the client device, or by any device at any point along the content distribution.

The metadata may be inserted into every audio frame and every video frame. The metadata may be inserted into the audio frames and the video frames based on an interval. The metadata may be information associated with synchronizing the audio frames and the video frames. Each video frame and audio frame may be assigned an identifier (ID). Each video frame may have an associated video frame ID. The video frame ID may be unique for each video frame. Each audio frame may have an associated audio frame ID. The audio frame ID may be unique for each audio frame. Each audio frame may also indicate any associated video frames. The audio frame may comprise metadata that indicates one or more video frames that the audio frame shares an output (e.g., presentation, display, delivery, etc.) time with. The metadata may have the video frame ID of an associated video frame. The associated video frame may be a video frame that the output of the video frame occurs concurrently with the audio frame.

The metadata may indicate an output (e.g., presentation, display, delivery, etc.) delta. The output delta may be associated with a specific video frame and a specific audio frame. The output delta may be determined. To determine the output delta, a video frame may be identified by the device. Any audio frames whose output (e.g., presentation, display, delivery, etc.) starts during the identified video frame's output (e.g., presentation, display, delivery, etc.) may also be identified by the device. There may be multiple audio frames that are associated with a single video frame. For each audio frame determined to start output during the video frame's output, the output delta may be the difference in the output time of the associated audio frame with that of the video frame. The device may determine the output delta for each audio frame associated with the video frame. The device may insert a respective output delta into the video frame for each associated audio frame.

The central location 101 may be one or more modulators 115 for interfacing to a network 116. The modulators 115 may convert the received content into a modulated output signal suitable for transmission over the network 116. The output signals from the modulators 115 may be combined, using equipment such as a combiner 117, for input into the network 116.

The network 116 may be a content delivery network, a content access network, and/or the like. The network 116 may be configured to provide content from a variety of sources using a variety of network paths, protocols, devices, and/or the like. The content delivery network and/or content access network may be managed (e.g., deployed, serviced) by a content provider, a service provider, and/or the like. The network 116 may facilitate delivery of audio content and video content. The audio content may be sent in one or more streams of content. The one or more streams of audio content may have different bitrates, framerates, resolutions, codecs, languages, and so forth. The video content may be sent in one or more streams of content. The one or more streams of video content may have different bitrates, framerates, resolutions, codecs, languages, and so forth. The audio content may be audio frames, and the video content may be video frames. The video frames and the audio frames may be associated with each other. That is, the video frames may have audio frames that correspond to audio that is output (e.g., presentation, display, delivery, etc.) during output (e.g., presentation, display, delivery, etc.) of the video frame. The video frames and the audio frames should be synchronized together for output (e.g., presentation, display, delivery, etc.) of the video and audio content. However, errors in the output (e.g., presentation, display, delivery, etc.) time of the audio frame and/or video frame may be created during transmission of the audio and video content via the network 116. Further, errors may occur in one or more components of the central location 101, such as the multiplexer 114, that may cause the error in the output time of the audio frame and/or video frame. Accordingly, the audio frames may not be synchronized with the video frames.

A control system 118 may permit a system operator to control and monitor the functions and performance of system 100. The control system 118 may interface, monitor, and/or control a variety of functions, including, but not limited to, the channel lineup for the television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The signals may be one or more streams of content. The streams of content may be audio content and/or video content. The audio content may have a stream separate from the video content. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116 at one or more of the user locations. At the user location 119, a media device 120 may demodulate and/or decode (e.g., determine one or more audio frames and video frames), if needed, the signals for display on a display device 121, such as on a television set (TV) or a computer monitor. The media device 120 may be a demodulator, decoder, frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may be a set-top box, a digital streaming device, a gaming device, a media storage device, a digital recording device, a combination thereof, and/or the like. The media device 120 may have one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The media device 120 may receive the content and determine whether a synchronization error exists in the received content. The media device 120 may receive audio content and video content. The audio content may have one or more audio frames. The video content may have one or more video frames. The one or more audio frames and the one or more video frames may have metadata. The metadata may be inserted into every audio frame and every video frame. The metadata may be inserted into the audio frames and the video frames based on an interval. The metadata may be information associated with synchronizing the audio and video.

Each video and audio frame may be assigned an identifier (ID). Each video frame may have an associated video frame ID. The video frame ID may be unique for each video frame. Each audio frame may have an associated audio frame ID. The audio frame ID may be unique for each audio frame. Each audio frame may also indicate any associated video frames. The audio frame may comprise metadata that indicates one or more video frames that the audio frame shares an output (e.g., presentation, display, delivery, etc.) time with. The metadata may comprise the video frame ID of the associated video frame. The associated video frame may be the video frame that the output of the video frame occurs concurrently with the audio frame.

The metadata may have an output (e.g., presentation, display, delivery, etc.) delta. The output delta may be associated with a specific video frame and a specific audio frame. For each audio frame determined to start output (e.g., presentation, display, delivery, etc.) during the video frame's output (e.g., presentation, display, delivery, etc.), the output delta may be the difference in the output time of the associated audio frame with that of the video frame.

The metadata may be extracted by the media device 120. The media device 120 may determine a synchronization error based on the metadata. If necessary, the media device 120 may adjust an output (e.g., presentation, display, delivery, etc.) time associated with an audio frame and/or an output (e.g., presentation, display, delivery, etc.) time associated with a video frame to ensure the audio frame and/or the video frame are properly synchronized. The audio frames and/or the video frames may require decrypting. Accordingly, the media device 120 may be capable of decrypting the audio frames and/or the video frames to determine the metadata.

The media device 120 may extract from each audio frame an audio frame ID and a video frame ID associated with the audio frame. The media device 120 may determine an associated video frame. The media device 120 may determine an associated video frame based on the video frame ID. The media device 120 may search segments of content for the associated video frame. The media device 120 may search segments of content that occur up to four seconds before the output of the audio frame, and up to four seconds after the output of the audio frame, for the associated video frame. The media deice 120 may determine a video frame ID from the associated video frame. The media deice 120 may determine the video frame ID based on metadata of the associated video frame. The media device 120 may determine one or more audio frame IDs from the associated video frame. The media device 120 may determine the one or more audio frame IDS based on the metadata of the associated video frame. The media device 120 may determine one or more output (e.g., presentation, display, delivery, etc.) deltas from the associated video frame. The media device 120 may determine the one or more output deltas based on the metadata of the associated video frame. Each audio frame associated with the video frame may have a respective output delta. The respective output delta may be unique for each audio frame.

The media device 120 may determine an output (e.g., presentation, display, delivery, etc.) time of the video frame. The media device 120 may determine the output time of the video frame based on the metadata of the video frame. The media device 120 may determine an output (e.g., presentation, display, delivery, etc.) of an audio frame associated with the video frame. The media device 120 may determine the output (e.g., presentation, display, delivery, etc.) time of the audio frame associated with the audio frame based on the metadata of the audio frame. The output time of the audio frame may not be in the metadata of the audio frame. The media device 120 may determine the output time of the audio frame based on one or more attributes of the content. The one or more attributes of the content may include an audio output (e.g., presentation, display, delivery, etc.) frame rate (e.g., a frame rate that audio frames are output and/or presented at). The media device 120 may determine the output time of the audio frame based on a previous audio frame's output (e.g., presentation, display, delivery, etc.) time. The media device 120 may determine the output time of the audio frame based on an audio output frame rate. The media device 120 may determine the output time of the audio frame based on the previous audio frame's output time and the audio output frame rate. The media device 120 may determine the output time of the audio frame by adding the reciprocal of the frame rate to the previous audio frames output time. For example, if the audio output frame rate is 30 frames per second, the media device 120 may add 0.033 seconds (e.g., 1 second/30) to the previous audio frame's output time to determine the output time of the audio frame. The media device 120 may determine a synchronization error exists if the output time stored in the metadata of the audio frame does not equal the output time determined from the previous audio frame's output time and the audio output frame rate. The media device 120 may correct the audio output time of the audio frame based on the determined output time of the audio frame.

The media device 120 may determine a calculated output (e.g., presentation, display, delivery, etc.) delta. The media device 120 may determine the calculated output delta after determining there is no synchronization error with the audio frame. The media device 120 may determine the calculated output delta after correcting a synchronization error associated with the audio frame. The media device 120 may determine the calculated output delta after determining the correct audio output time of the audio frame. The calculated output delta may be the difference in output times of the video frame and the audio frame. The media device 120 may determine the calculated output delta based on the correct audio output time and the output time of the video frame determined from the metadata. The media device 120 may compare the calculated output delta to the output delta stored in the metadata of the video frame.

The media device 120 may determine an error in the output delta stored in the metadata of the video frame. The media device 120 may determine the error in the output delta stored in the metadata of the video frame based on the calculated output delta. The media device 120 may determine the error in the output delta stored in the metadata of the video frame based on comparison between the calculated output delta and the output delta stored in the metadata of the video frame. The media device 120 may determine the error if a difference between the output delta stored in the metadata of the video frame and the calculated output delta satisfies a threshold. The threshold may be whether the calculated output delta is greater than or equal to the output delta stored in the metadata of the video frame plus the reciprocal of the frame rate. The threshold may be whether the calculated output delta is less than or equal to the output delta stored in the metadata of the video frame minus the reciprocal of the frame rate. Stated differently, if the calculated output delta is outside of a value (e.g., +/−(1/video frame rate)) away from the output delta stored in the metadata of the video frame, then a synchronization error may exist. For example, if the frame rate is 30 frames per second, the threshold may be satisfied if the calculated output delta is +/−0.033 away from the output delta stored in the metadata of the video frame. The threshold being satisfied may indicate a synchronization error.

The media device 120 may correct the synchronization error. The media device 120 may correct the synchronization error based on the corrected audio frame output time and the output delta stored in the metadata of the video frame. The media device 120 may subtract the output delta from the output time of the corrected audio frame to determine a correct output time of the video frame. The media device 120 may correct the synchronization error by utilizing the determined correct output time of the video frame and the output time of the corrected audio frame. The media device 120 may output the video frame and the audio frame based on the correct output times.

Each video frame may have a decode time that indicates when the video frame should be decoded, which is different from the output time of the video frame. The decode time may provide a buffer based on how long the media device 120 will need to decode the video frame. Thus, the decode time may be a time prior to the output time of the video frame in order to provide the media device 120 sufficient time to decode and process the video frame prior to the output time. The decode time may be based on the output time of the video frame. The decode time may have a decode delay associated with the output time. The decode delay may be a predetermined period of time. The decode delay may be determined by the media device 120. The decode delay may be determined by the media device 120 based on one or more characteristics of the media device 120. The one or more characteristics may include, but are not limited to, processing capability, memory, utilization of the media device 120, and so forth.

The decode time may have an error. The decode time may have an error because the output time has an error. The decode time may have an error because the decode time is based on the output time. The decode time may have an error because the decode delay associated with the decode time is associated with the output time. After correcting the output time (e.g., the synchronization error), the media device 120 may correct the decode time of the video frame to reflect the proper buffer needed prior to the output time of the video frame. The media device 120 may subtract the decode delay from the corrected output time of the video frame to determine the decode time.

While the media device 120 has been described as having the capability to correct a synchronization error for ease of explanation, a person skilled in the art would appreciate that any device in the system 100, such as the combiner 117, the application server 126, the content source 127, the edge device 128, etc., may determine and correct a synchronization error with the content.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. For a cable network, the communication terminal 122 may be configured to provide network access via a variety of communication protocols and standards, such as Data Over Cable Service Interface Specification (DOC SIS).

The user location 119 may have a first access point 123, such as a wireless access point. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to provide data, handle requests, and/or otherwise facilitate operation of applications for the user.

The system 100 may have one or more content sources 127. The content source 127 may be configured to provide content (e.g., video, audio, games, applications, data) to the user. The content source 127 may be configured to provide streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to provide the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The content source 127 may provide audio content and video content. The content source 127 may provide one or more audio frames of audio content and one or more video frames of video content. The content source 127 may encode the audio frames and the video frames. The content source 127 may encode metadata into the audio frames and the video frames. The metadata encoded by the content source 127 may include an identifier associated with the frame, as well as any identifiers for any frames associated with the frame, an output time of the associated frame, an output delta, a decode delay, or any metadata for the audio and video frames.

Data may be inserted into the content at the content source 127. The data may be metadata. The content source 127 may encode data into the content. The metadata may be inserted by the device in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with content source 127. The metadata may also be inserted at other stages in a content distribution network such as at a packager, at a cache device associated with the content distribution network, at an input to the client device, or by any device at any point along the content distribution.

The metadata may be inserted by the content source 127 into every audio frame and every video frame. The content source 127 may insert the metadata into the audio frames and the video frames based on an interval. The metadata may be information associated with synchronizing the audio and video. The audio frame may have metadata that indicates one or more video frames that the audio frame shares an output (e.g., presentation, display, delivery, etc.) time with. The metadata may have a video frame ID of an associated video frame. The associated video frame may be a video frame that the output of the video frame occurs concurrently with the audio frame.

The metadata may have an output (e.g., presentation, display, delivery, etc.) delta. The output delta may be associated with a specific video frame and a specific audio frame. The content source 127 may determine the output delta for each audio frame associated with the video frame. The content source 127 may insert a respective output delta into the video frame for each associated audio frame. While the content source 127 has been described as providing the audio content and video content, as well as encoding the metadata, for ease of explanation, a person of ordinary skill in the art would appreciate that any device in the system 100 may provide the content as well as encode the metadata such as, the edge device 128, described further below.

The system 100 may be an edge device 128. The edge device 128 may be configured to provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to package content for delivery to the user (e.g., in a specific format requested by a user device), provide the user a manifest file (e.g., or other index file describing portions of the content), provide streaming content (e.g., unicast, multicast), provide a file transfer, and/or the like. The edge device 128 may cache or otherwise store content (e.g., frequently requested content) to enable faster delivery of content to users.

The network 116 may have a network component 129. The network component 129 may be any device, module, and/or the like communicatively coupled to the network 116. The network component 129 may also be a router, a switch, a splitter, a packager, a gateway, an encoder, a storage device, a multiplexer, a network access location (e.g., tap), physical link, and/or the like.

Any of the application server 126, the content source 127, the edge device 128, and/or the media device 120 may serve as a server relative to a user device, such as the media device 120 and/or the mobile device 124, and may determine a synchronization error with content. The central location 101, application server 126, the content source 127, the edge device 128, and/or the media device 120 may introduce errors in the video and audio output times and may subsequently correct the errors introduced in the video and audio output times. Any of the application server 126, the content source 127, the edge device 128 The application server 126, the content source 127, the edge device 128, and/or the media device 120 may determine a synchronization error between audio content and video content. The synchronization error may be between an audio frame and a video frame. The synchronization error may be determined based on metadata of the audio frame and metadata of the video frame.

Figure 2:
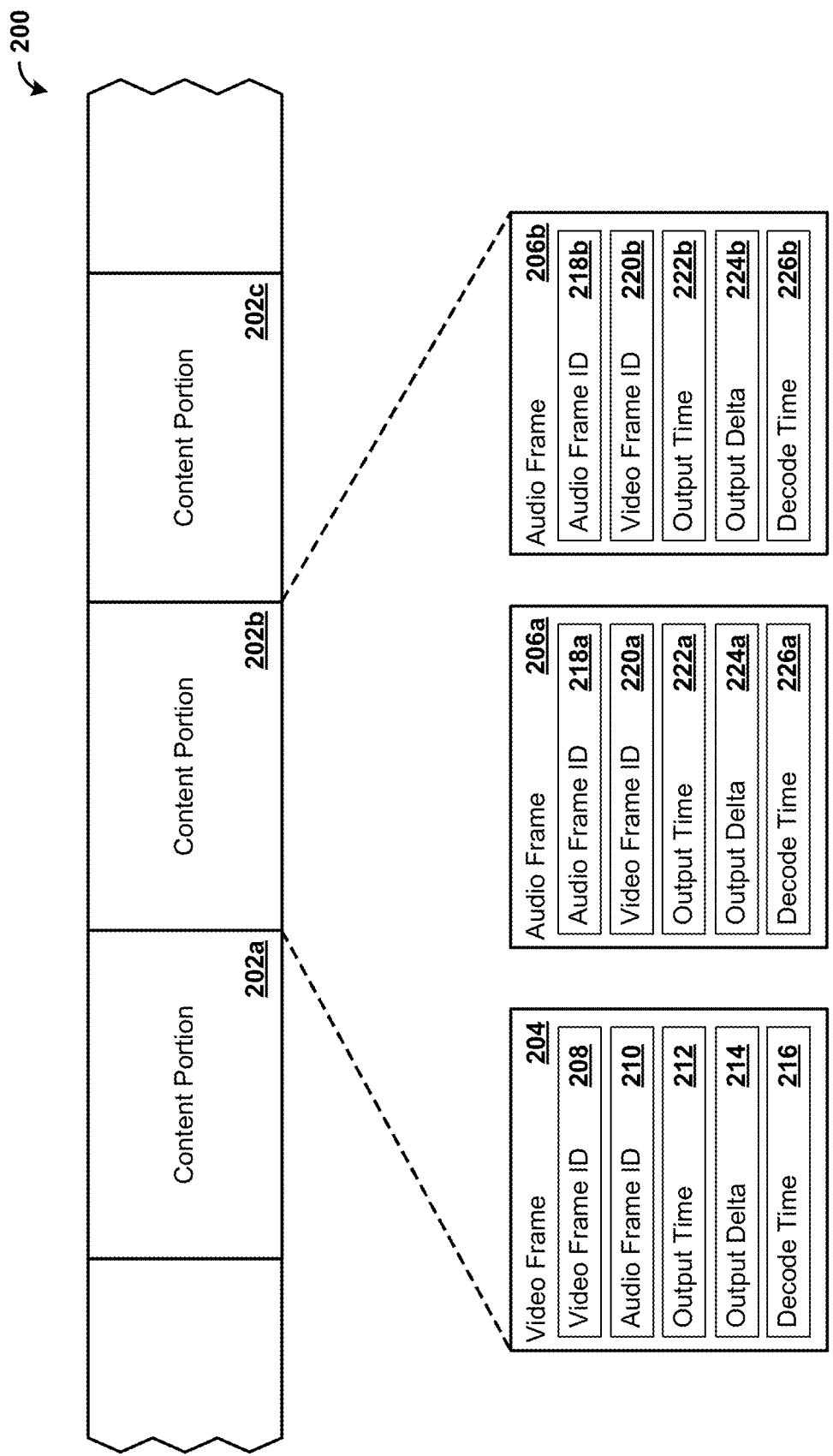
FIG. 2 shows an example diagram of content.

FIG. 2 shows an example content 200 provided by a content provider. The content 200 may be video content output to a viewer. The content 200 may have both audio content and video content. The content 200 may have a plurality of content portions 202. The content 200 may have content portions 202a, 202b, and 202c. The content 200 may be displayed in a continuous manner to a viewer. The content portions 202 are displayed in order from left to right such that the content portion 202a may be output at a time before the content portion 202b and so forth. When the content portion 202a ends, the content portion 202b automatically starts. Some non-limiting examples of a content portion may include one or more scenes of the television programming, one or more commercials (e.g., a commercial break), one or more scenes of a movie, a live sporting event, and so forth. The content portions 202 may be packets of content. The content portions 202 may be packets of content comprising audio content and video content. The content portions 202 may be streams of content. The video content of the content portions 202 may be associated with a first stream, and the audio content of the content portions 202 may be associated with a second stream. Each video content and each audio content may have an associated stream. The audio content may be associated with one or more streams of audio content that may have different bitrates, framerates, resolutions, codecs, languages, and so forth. The video content may be associated with one or more streams of video content that may have different bitrates, framerates, resolutions, codecs, languages, and so forth. While the content portions 202 are shown as being equal, a person skilled in the art would appreciate the content portions 202 may each be different lengths and contain different content.

The content portions 202 may have one or more frames of content associated with each respective content portion 202. The content portion 202b may have a video frame 204, an audio frame 206a, and an audio frame 206b. The video frame 204 may have metadata associated with the video frame 204. Specifically, the video frame 204 may have metadata that has a video frame identifier (ID) 208, an audio frame ID 210, an output time 212, an output delta 214, and a decode time 216. The output (e.g., presentation, display, delivery, etc.) time 212 indicates a time that the video frame 204 should be output to a viewer. The output time 212 may be in reference to a uniform time and may be standard across any computing device that determines the output time 212 from the video frame 204. The output time 212 may be a time period that the video frame 204 is presented to the user. The video frame 204 may have additional metadata.

The video frame ID 208 may be a unique identifier of the video frame 204. A computing device may use the video frame ID 208 to identify the video frame 204. The video frame 204 may have one or more audio frame IDs 210. The audio frame ID 210 may identify and/or indicate an audio frame that is associated with the video frame 204. The audio frame ID 210 may identify an audio frame (e.g., the audio frames 206) that has an output time that overlaps with the output time 212 of the video frame 204. The audio frame ID 210 may identify a plurality of audio frames 206 that have an output time that overlaps with the output time 212 of the video frame 204.

The decode time 216 may be a time at which the video frame 204 is to be decoded. The decode time 216 may be associated with the output time 212. The decode time 216 may indicate the processing time necessary to decode the video frame 204 in order for the video frame 204 to be ready for output at the output time 212. The decode time 216 may indicate a length of time required to decode the video frame 204, and a computing device may use the decode time 216 to determine when the video frame 204 should be decoded based on the output time 212. The decode time 216 may indicate a decode delay. The decode delay may indicate the processing time necessary to decode the video frame 204 in order for the video frame 204 to be ready for output at the output time 212. That is, the decode delay may indicate a period of time that the output (e.g., presentation, display, delivery, etc.) of the video frame 204 will be delayed due to the processing time required to decode the video frame 204. The decode delay may be a coded picture buffer delay.

The output (e.g., presentation, display, delivery, etc.) delta 214 may indicate a difference between the output time 212 of the video frame 204 and one of the audio frames associated with the video frame 204 (e.g., the audio frames 206). The output delta 214 may be unique for each video frame 204 and each associated audio frame 206. That is, the output delta 214 associated with the video frame 204 and the audio frame 206a may be a unique output delta 214 as compared to the output delta 214 of the video frame 204 and the audio frame 206b. However, even though the output delta 214 may be unique for each video frame 204 and audio frame 206, that does not mean that the output deltas 214 are necessarily different. Rather, the output deltas 214 may be the same depending on the output time 212 of the video frame 204 and the output times of the associated audio frames 206.

The audio frame 206a may have metadata associated with the audio frame 206a. Specifically, the audio frame 206a may have an audio frame identifier (ID) 218a, a video frame ID 220a, an output time 222a, an output delta 224a, and a decode time 226a. The output (e.g., presentation, display, delivery, etc.) time 222a indicates a time that the audio frame 206a should be output (e.g., presented, displayed, delivered, etc.) to a viewer. The output time 222a may be in reference to a uniform time and may be standard across any computing device that determines the output time 222a from the audio frame 206a. The output time 222a may be a time period that the audio frame 206a is presented to the user. The audio frame 206a may have additional metadata.

The audio frame ID 218a may be a unique identifier of the audio frame 206a. A computing device may use the audio frame ID 218a to identify the audio frame 206a. The audio frame 206a may have one or more video frames ID 220. The video frame ID 220a may identify and/or indicate a video frame that is associated with the audio frame 206a. The video frame ID 220a may identify a video frame (e.g., the video frame 204) that has an output time that overlaps with the output time 222a of the audio frame 206a. The video frame ID 220a may identify a video frame that the audio frame 206a begins output in. That is, the output time 212 of the video frame 204 may overlap with the output time 222a of the audio frame 206a.

The decode time 226a may be a time at which the audio frame 206a is to be decoded. The decode time 226a may be associated with the output time 222a. The decode time 226a may indicate the processing time necessary to decode the audio frame 206a in order for the audio frame 206a to be ready for output (e.g., presentation, display, delivery, etc.) at the output time 222a. The decode time 226a may indicate a length of time required to decode the audio frame 206a, and a computing device may use the decode time 226a to determine when the audio frame 206a should be decoded based on the output time 222a. The decode time 226a may indicate a decode delay. The decode delay may indicate the processing time necessary to decode the audio frame 206a in order for the audio frame 206a to be ready for output at the output time 222a. That is, the decode time 226a may indicate a period of time that the output of the audio frame 206a will be delayed due to the processing time required to decode the audio frame 206a.

The output (e.g., presentation, display, delivery, etc.) delta 224a may indicate a difference between the output time 222a of the audio frame 206a and one or more video frames associated with the audio frame 206a (e.g., the video frames 204). The output delta 224a may be unique for the audio frame 206a and each associated video frame 204. That is, the output delta 224a associated with the audio frame 206a and the video frame 204 may be a unique output delta 224a as compared to the output delta 224b of the audio frame 206b and the video frame 204.

The audio frame 206b may have metadata associated with the audio frame 206b. Specifically, the audio frame 206b may have metadata that has an audio frame identifier (ID) 218b, a video frame ID 220b, an output time 222b, an output delta 224b, and a decode time 226b. The output (e.g., presentation, display, delivery, etc.) time 222b indicates a time that the audio frame 206b should be output (e.g., presented, displayed, delivered, etc.) to a viewer. The output time 222b may be in reference to a uniform time and may be standard across any computing device that determines the output time 222b from the audio frame 206b. The output time 222b may be a time period that the audio frame 206b is presented to the user. The audio frame 206b may have additional metadata.

The audio frame ID 218b may be a unique identifier of the audio frame 206b. A computing device may use the audio frame ID 218b to identify the audio frame 206b. The audio frame 206b may have one or more video frames ID 220. The video frame ID 220b may identify and/or indicate a video frame that is associated with the audio frame 206b. The video frame ID 220b may identify a video frame (e.g., the video frame 204) that has an output time that overlaps with the output time 222b of the audio frame 206b. The video frame ID 220b may identify a video frame that the audio frame 206b begins output in. That is, the output time 212 of the video frame 204 may overlap with the output time 222b of the audio frame 206b.

The decode time 226b may be a time at which the audio frame 206b is to be decoded. The decode time 226b may be associated with the output time 222b. The decode time 226b may indicate the processing time necessary to decode the audio frame 206b in order for the audio frame 206b to be ready for output (e.g., presentation, display, delivery, etc.) at the output time 222b. The decode time 226b may indicate a length of time required to decode the audio frame 206b, and a computing device may use the decode time 226b to determine when the audio frame 206b should be decoded based on the output time 222b. The decode time 226b may indicate a decode delay. The decode delay may indicate the processing time necessary to decode the audio frame 206b in order for the audio frame 206b to be ready for output (e.g., presentation, display, delivery, etc.) at the output time 222b. That is, the decode time 226b may indicate a period of time that the output of the audio frame 206b will be delayed due to the processing time required to decode the audio frame 206b.

The output (e.g., presentation, display, delivery, etc.) delta 224b may indicate a difference between the output time 222b of the audio frame 206b and one or more video frames associated with the audio frame 206b (e.g., the video frames 204). The output delta 224b may be unique for the audio frame 206b and each associated video frame 204. That is, the output delta 224b associated with the audio frame 206b and the video frame 204 may be a unique output delta 224b as compared to the output delta 224a of the audio frame 206a and the video frame 204.

In operation, synchronization error detection may involve the following steps. Extract from each audio frame (e.g., the audio frames 206) an audio frame ID (e.g., the audio frame IDs 218) and the associated video frame ID (e.g., the video frame IDs 220). Determine (e.g., search for) a corresponding video frame (e.g., the video frame 204) based on the extracted video frame ID. The search for a video frame may be done in segments (e.g., done in content portions 202). The search for the video frame may be a maximum amount of time (e.g., four seconds) before and after the audio frame. The search may include one or more content portions 202. Once the video frame is found and/or identified, extract the video frame ID (e.g., the video frame ID 208) from the video frame, the Audio frame(s) IDs (e.g., the audio frame ID 210) associated with the video frame, and output (e.g., presentation, display, delivery, etc.) delta(s) (e.g., the output deltas 214, 224). The output delta(s) may be represented as DELTA_P[x][y] where x is the video frame and y is an audio frame from a set of audio frames whose output start overlaps with the x video frame output. Each audio frame may have a respective output delta.

The audio and video output times (e.g., the output times 212, 222) are determined from the corresponding frames VIDEO_OUTPUT_TIME_IN_FRAME[x] and AUDIO_OUTPUT_TIME_IN_FRAME[y]. The audio output time may not be included for an audio frame. If the audio output time is not included for the audio frame, the output time may be calculated from the audio content. The audio output time for an audio frame may be determined based on a previous audio frame's output time and the audio output frame rate. AUDIO_OUTPUT_TIME_IN_FRAME[y]= AUDIO_OUTPUT_TIME_IN_FRAME[y−1]+1/audio_frame_rate. If the audio output time does not equal the audio output time of the preceding audio frame plus the reciprocal of the audio frame rate, then there may be a synchronization error in the audio frame.

The audio output time of the audio frame may be corrected using the following equation, AUDIO_OUTPUT_TIME_IN_FRAME[y]=AUDIO_OUTPUT_TIME_IN_FRAME[y−1]+1/audio frame rate.

After correcting the audio synchronization error, or if there is no synchronization error, a calculated output delta may be determined (DELTA_P_CALC[x][y]), which may be the difference in the output times of the video frame and the audio frame. If the calculated output delta does not equal the DELTA_P[x][y] determined from the video frame, as discussed above, within a tolerance value, then there may be a synchronization error associated with the video frame. DELTA_P_CALC[x][y]=AUDIO_OUTPUT_TIME_IN_FRAME[y]−VIDEO_OUTPUT_TIME_IN_FRAME[x]

A synchronization error may occur if one of the following conditions is true, DELTA_P_CALC[x][y]>DELTA_P[x][y]+1/video_frame_rate, or DELTA_P_CALC[x][y] <= DELTA_P[x][y]−1/video_frame_rate. The 1/video_frame_rate may be a tolerance value. The detected synchronization error may be corrected based on the output delta. VIDEO_OUTPUT_TIME_IN_FRAME CORR[x]=AUDIO_OUTPUT_TIME_IN_FRAME[x]−DELTA_P[x][y].

Each video frame may have a decode time (e.g., the decode time 216) that indicates when the video frame should be decoded, which may be different from the output time (e.g., the output time 212) of the video frame. The decode time may provide a buffer based on how long a computing device will need to decode the video frame. Thus, the decode time may be a time prior to the output time in order to provide the computing device sufficient time to decode and process the video frame prior to the output time. The decode time may have an error. After correcting the synchronization error, the decode time of the video frame may also be corrected to reflect the proper buffer needed prior to the output time of the video frame.

If the corrected video output time stamp when compared to its decode time does not meet the condition below, then a decode error may occur. VIDEO_DECODE_TIME_IN_FRAME[y]+Video_decode_delay>VIDEO_OUTPUT_TIME_IN_FRAME CORR[y]. The decode time stamp may be corrected by the following equation: VIDEO_DECODE_TIME_IN_FRAME CORR[y]=VIDEO_OUTPUT_TIME_IN_FRAME CORR[y]−Video_decode_delay. While the decode time associated with the video frame was explained above for ease of explanation, a person skilled in the art would appreciate that the decode time of the audio frames (e.g., the decode times 226) may also be corrected in a similar manner.

Figure 3:
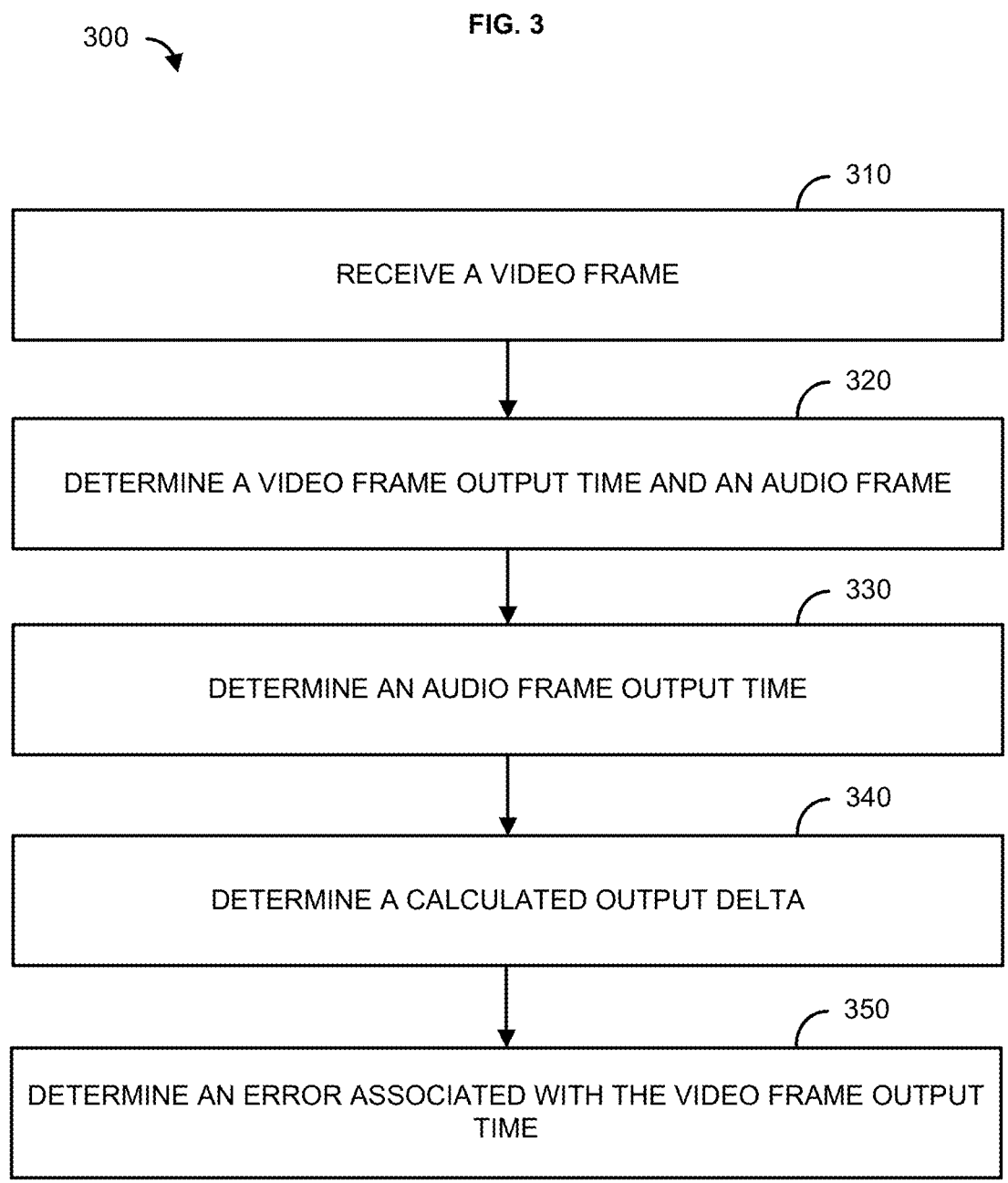
FIG. 3 shows a flowchart of an example method for content synchronization.

FIG. 3 shows a flowchart of an example method 300 for content synchronization. At step 310, a video frame (e.g., the video frame 204 of FIG. 2) may be received. The video frame may be received by a computing device (e.g., the application server 126, the content source 127, the edge device 128, the media device 120, the display 121, the communication terminal 122, and/or the mobile device 124 of FIG. 1). The video frame may be a video frame of a content portion (e.g., the content portions 202 of FIG. 2). The video frame may have video frame metadata (e.g., the video frame identifier 208, the audio frame ID 210, the output time 212, the output delta 214, and the decode time 216 of FIG. 2).

At step 320, a video frame output (e.g., presentation, display, delivery, etc.) time (e.g., the output time 212 of FIG. 2) and an audio frame (e.g., the audio frames 206*a,b* of FIG. 2) may be determined. The video frame output time and the audio frame may be determined by the computing device. The video frame output time may be determined from the metadata of the video frame. The audio frame may be determined from the metadata (e.g., the audio frame ID 210 of FIG. 2) of the video frame. The audio frame may have audio content. The audio frame may have an output time that occurs during output of the video frame. The audio frame may have audio content that begins output during output of the video frame. For example, the video frame may have an output time of 55.4 seconds. The video frame output may last from 55.4 seconds to 56 seconds.

At step 330, an audio frame output (e.g., presentation, display, delivery, etc.) time (e.g., the output times 222 of FIG. 2) may be determined. The audio frame output time may be determined by the computing device. The audio frame output time may be determined from the metadata of the audio frame. For example, the audio frame may have an audio frame output time of 55.8 seconds, which occurs during the video frame output (e.g., between 55.4 seconds and 56 seconds).

At step 340, a calculated output (e.g., presentation, display, delivery, etc.) delta may be determined. The calculated output delta may be determined by the computing device. The calculated output delta may be determined based on the video frame output time and the audio frame output time. The calculated output delta may be a difference between the video frame output time and the audio frame output time. For example, the calculated output delta may be −0.4 based on the difference between the video frame output time of 55.4 seconds and the audio frame output time of 55.8 seconds.

At step 350, an error associated with the video frame output time may be determined. The error associated with the video frame output time may be determined by the computing device. The error may be determined based on a comparison between the calculated output delta and the output delta of the video frame (e.g., the output delta 214 of FIG. 2). The output delta may be determined at a time that the video frame is encoded, transcoded, re-multiplexed, or processed. The output delta may be determined from the metadata of the video frame. For example, the output delta of the video frame may indicate that the output delta is −0.5. The error associated with the video frame output time may be determined based on a difference between the calculated output delta and the output delta of the video frame satisfying a threshold. If the difference between the output delta of the video frame and the calculated output delta is zero, then there may be no error associated with the output time of the video frame. If the difference between the output delta of the video frame and the calculated output delta satisfies a threshold (e.g., is outside the threshold), there may be an error with the output time of the video frame (e.g., a synchronization error). For example, the threshold may be whether the output delta of the video frame is outside of a value (e.g., +/−1/(a video frame rate)) of the calculated output delta. For example, if the frame rate is 30 frames per second, the output delta of the video frame may need to be within +/−0.03 from the calculated output delta to indicate that there is not an error with the output time of the video frame (e.g., there is not a synchronization error). As an example, if the output delta of the video frame is outside of +/−0.03 from the calculated output delta, then there may be an error with the output time of the video frame (e.g., there is a synchronization error). The difference between the output delta of −0.5 and the calculated output delta of −0.4 may be 0.1. Accordingly, based on the difference between the output delta and the calculated output delta being more than +/−0.03 from each other, an error with the output time of the video frame may be determined. The difference between the output delta and the calculated output delta satisfying the threshold may indicate an error with the video frame output time. The error associated with the video frame output time may indicate a synchronization error between the video frame and the audio frame. The synchronization error may be a lip synchronization error between the video frame and the audio frame.

The error associated with the video frame output time may be corrected. The computing device may correct the error associated with the video frame output time. The computing device may correct the error associated with the video frame output time based on the audio frame output time. The error may be corrected based on determining the audio output time of the audio frame is correct. After the audio frame is determined to be correct, the output delta is subtracted from the audio frame output time to determine the correct video output time. The video frame may be presented based on the corrected output time.

A verified audio frame output time may be determined. The verified audio frame output time may be determined based on an audio frame rate. The verified audio frame output time may be determined based on a previously occurring audio frame. The previously occurring audio frame may be an audio frame that immediately precedes the audio frame. The verified audio frame output time may be determined based on an output time in the previously occurring audio frame. The verified audio frame output time may be determined by adding a value of time to the output time of the previously occurring audio frame. The value of time added to the output time may be based on the audio frame rate that the audio frames are presented. The value of time added to the output time may be the reciprocal of the audio frame rate. The audio output time of the audio frame may be verified based on a previously occurring audio frame's output time and an audio frame rate. For example, if the frame rate is 30 frames per second, the audio output time of the audio frame may need to be 0.03 seconds after the audio output time of the previously occurring audio frame. If the previously occurring audio frame's time is 55.77 seconds and the frame rate is 30 frames per second, the audio frame output time may be verified as correct if the audio frame output time is 55.8 seconds. The corrected video frame output time may be determined based on the verified audio frame output time. The corrected video frame output time may be determined by subtracting the output delta from the verified audio frame output time. For example, the audio frame output time may be verified correct at 55.8 seconds. Subtracting the output delta (e.g., 0.1) from the verified audio frame output time of 55.8 seconds may determine the correct video frame output time is 55.7 seconds. The video frame may be presented based on the corrected output time (e.g., at 55.7 seconds).

A video frame decode time may be determined to have an error. The error in the video frame decode time may be determined based on the video frame output time having an error. That is, because the video frame output time had an error, the decode time may also have an error because the decode time is based on the video frame output time. The corrected video frame output time may be used to correct the video frame decode delay. The video frame decode delay may be subtracted from the corrected video frame output time to determine the corrected video frame decode time. For example, the corrected video frame output time may be 55.7 seconds. The decode delay may be 0.5 seconds. Subtracting the decode delay from the corrected video frame output time may be 55.2 seconds. Thus, the corrected video frame decode time may be 55.2 seconds. The video frame decode time may indicate the time that the video frame needs to begin decoding in order to be presented on time.

Figure 4:
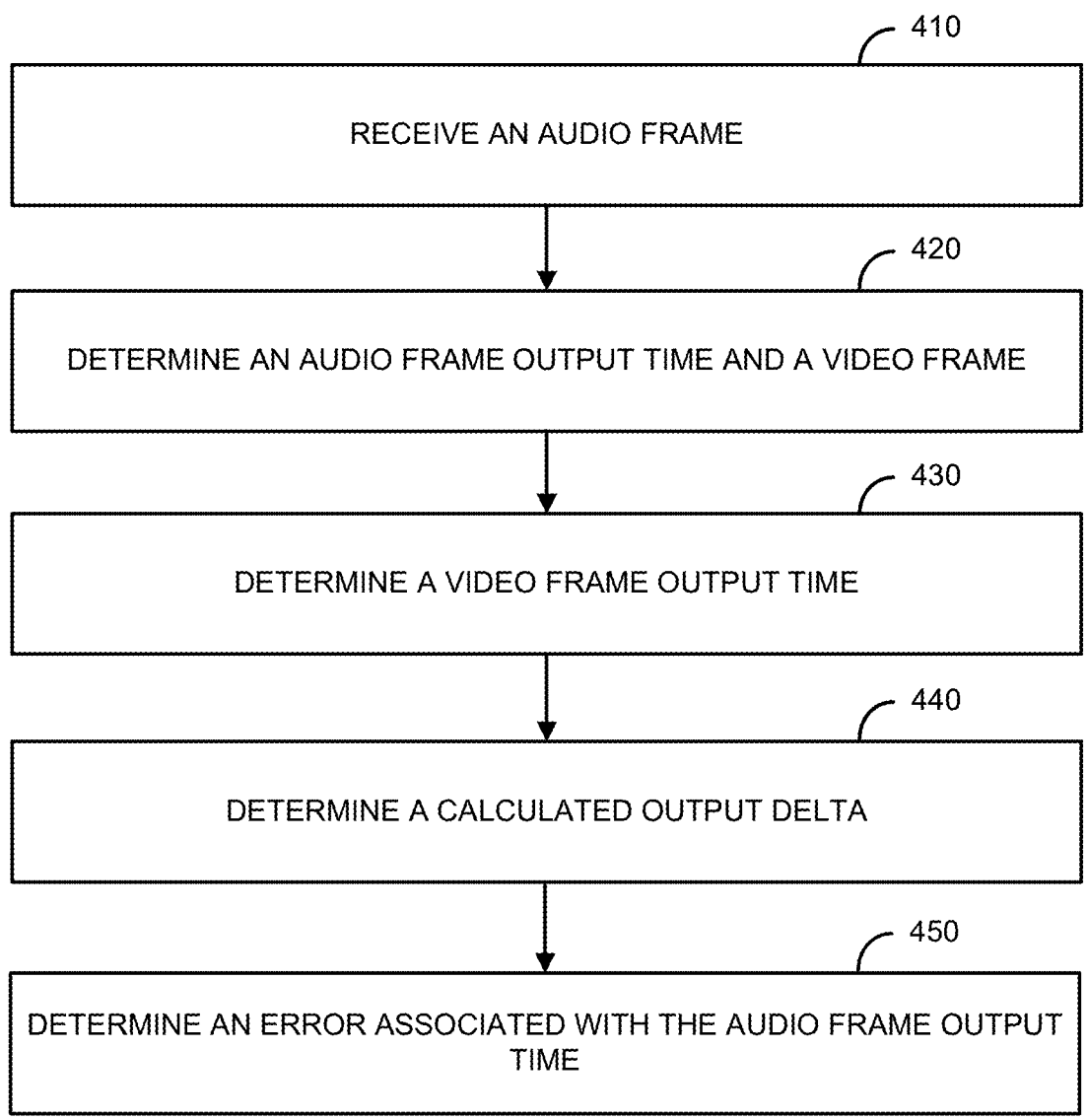
FIG. 4 shows a flowchart of an example method for content synchronization.

FIG. 4 shows a flowchart of an example method 400 for content synchronization. At step 410, an audio frame (e.g., the audio frame 206*a,b* of FIG. 2) may be received. The audio frame may be received by a computing device (e.g., the application server 126, the content source 127, the edge device 128, the media device 120, the display 121, the communication terminal 122, and/or the mobile device 124 of FIG. 1). The audio frame may be an audio frame of a content portion (e.g., the content portions 202 of FIG. 2). The audio frame may have audio frame metadata (e.g., the audio frame identifier 218, the video frame ID 220, the output time 222, the output delta 224, and the decode time 226 of FIG. 2).

At step 420, an audio frame output (e.g., presentation, display, delivery, etc.) time (e.g., the output time 222 of FIG. 2) and a video frame (e.g., the video frame 204 of FIG. 2) may be determined. The audio frame output time and the video frame may be determined by the computing device. The audio frame output time may be determined from the metadata of the audio frame. The video frame may be determined from the metadata (e.g., the video frame ID 220 of FIG. 2) of the audio frame. The video frame may have video content. The audio frame may have an output time that occurs during output of the video frame. The audio frame may have audio content that begins output during output of the video frame. For example, the audio frame may have an output time of 55.8 seconds.

At step 430, a video frame output (e.g., presentation, display, delivery, etc.) time (e.g., the output time 212 of FIG. 2) may be determined. The video frame output time may be determined by the computing device. The video frame output time may be determined from the metadata of the video frame. For example, the video frame may have a video frame output time of 55.4 seconds. The audio frame output may last from 55.4 seconds to 56 seconds. The audio frame output time of 55.8 second may occur during the audio frame output (e.g., between 55.4 seconds and 56 seconds).

At step 440, a calculated output (e.g., presentation, display, delivery, etc.) delta may be determined. The calculated output delta may be determined by the computing device. The calculated output delta may be determined based on the video frame output time and the audio frame output time. The calculated output delta may be a difference between the audio frame output time and the video frame output time. For example, the calculated output delta may be 0.4 based on the difference between the audio frame output time of 55.8 seconds and the video frame output time of 55.4 seconds.

At step 450, an error associated with the audio frame output time may be determined. The error associated with the audio frame output time may be determined by the computing device. The error may be determined based on a comparison between the calculated output delta and the output delta of the audio frame (e.g., the output delta 224 of FIG. 2). The output delta may be determined at a time that the audio frame is encoded, transcoded, re-multiplexed, and/or processed. For example, the output delta of the audio frame may indicate that the output delta is 0.5. The output delta may be determined from the metadata of the audio frame. The error associated with the audio frame output time may be determined based on a difference between the calculated output delta and the output delta of the audio frame satisfying a threshold. If the difference between the output delta of the audio frame and the calculated output delta is zero, then there may be no error associated with the output time of the audio frame. If the difference between the output delta of the audio frame and the calculated output delta satisfies a threshold (e.g., is outside the threshold), there may be an error with the output time of the audio frame (e.g., a synchronization error). The threshold may be whether the output delta of the audio frame is outside a value (e.g., +/−1/(an audio frame rate)) of the calculated output delta. For example, if the frame rate is 30 frames per second, the output delta of the audio frame may need to be within +/−0.03 from the calculated output delta to indicate that there is not an error with the output time of the audio frame (e.g., there is not a synchronization error). If the output delta is outside of +/−0.03 from the calculated output delta, then there may be an error with the output time of the audio frame (e.g., there is a synchronization error). The difference between the output delta of 0.5 and the calculated output delta of 0.4 may be 0.1. Accordingly, based on the difference between the output delta of the audio frame and the calculated output delta being more than +/−0.03 from each other, an error with the output time of the audio frame may be determined. The difference between the output delta of the audio frame and the calculated output delta satisfying the threshold may indicate an error with the audio frame output time. The error associated with the audio frame output time may indicate a synchronization error between the audio frame and the video frame. The synchronization error may be a lip synchronization error between the video frame and the audio frame.

The error associated with the audio frame output time may be corrected. The computing device may correct the error associated with the audio frame output time. The computing device may correct the error associated with the audio frame output time based on the video frame output time. The error may be corrected based on determining the video output time of the video frame is correct. After the video frame is determined to be correct, the output delta is subtracted from the video output time to determine the correct audio frame output time. The audio frame may be presented based on the corrected output time.

A verified audio frame output time may be determined. The verified audio frame output time may be determined based on an audio frame rate. The verified audio frame output time may be determined based on a previously occurring audio frame. The previously occurring audio frame may be an audio frame that immediately precedes the audio frame. The verified audio frame output time may be determined based on an output time in the previously occurring audio frame. The verified audio frame output time may be determined by adding a value of time to the output time of the previously occurring audio frame. The value of time added to the output time may be based on the audio frame rate that the audio frames are presented. The value of time added to the output time may be the reciprocal of the audio frame rate. The audio output time of the audio frame may be verified based on a previously occurring audio frame's output time and an audio frame rate. For example, if the frame rate is 30 frames per second, the audio output time of the audio frame may need to be 0.03 seconds after the audio output time of the previously occurring audio frame. If the previously occurring audio frame's time is 55.77 seconds and the frame rate is 30 frames per second, the audio frame output time may be verified as correct if the audio frame output time is 55.8 seconds. The corrected video frame output time may be determined based on the verified audio frame output time. The corrected video frame output time may be determined by subtracting the output delta from the verified audio frame output time. For example, the audio frame output time may be verified correct at 55.8 seconds. Subtracting the output delta (e.g., 0.1) from the audio frame output time of 55.8 seconds may determine the correct video frame output time is 55.7 seconds. The video frame may be presented based on the corrected output time (e.g., at 55.7 seconds).

A video frame decode time may be determine to have an error. The error in the video frame decode time may be determined based on the video frame output time having an error. That is, because the video frame output time had an error, the decode time may also have an error because the decode time is based on the video frame output time. The corrected video frame output time may be used to correct the video frame decode time. The video frame decode delay may be subtracted from the corrected video frame output time to determine the corrected video frame decode time. For example, the corrected video frame output time may be 55.7 seconds. The decode delay may be 0.5 seconds. Subtracting the decode delay from the corrected video frame output time may be 55.3 seconds. Thus, the corrected video frame decode time may be 55.3 seconds. The video frame decode time may indicate the time that the video frame needs to begin decoding in order to be presented on time.

Figure 5:
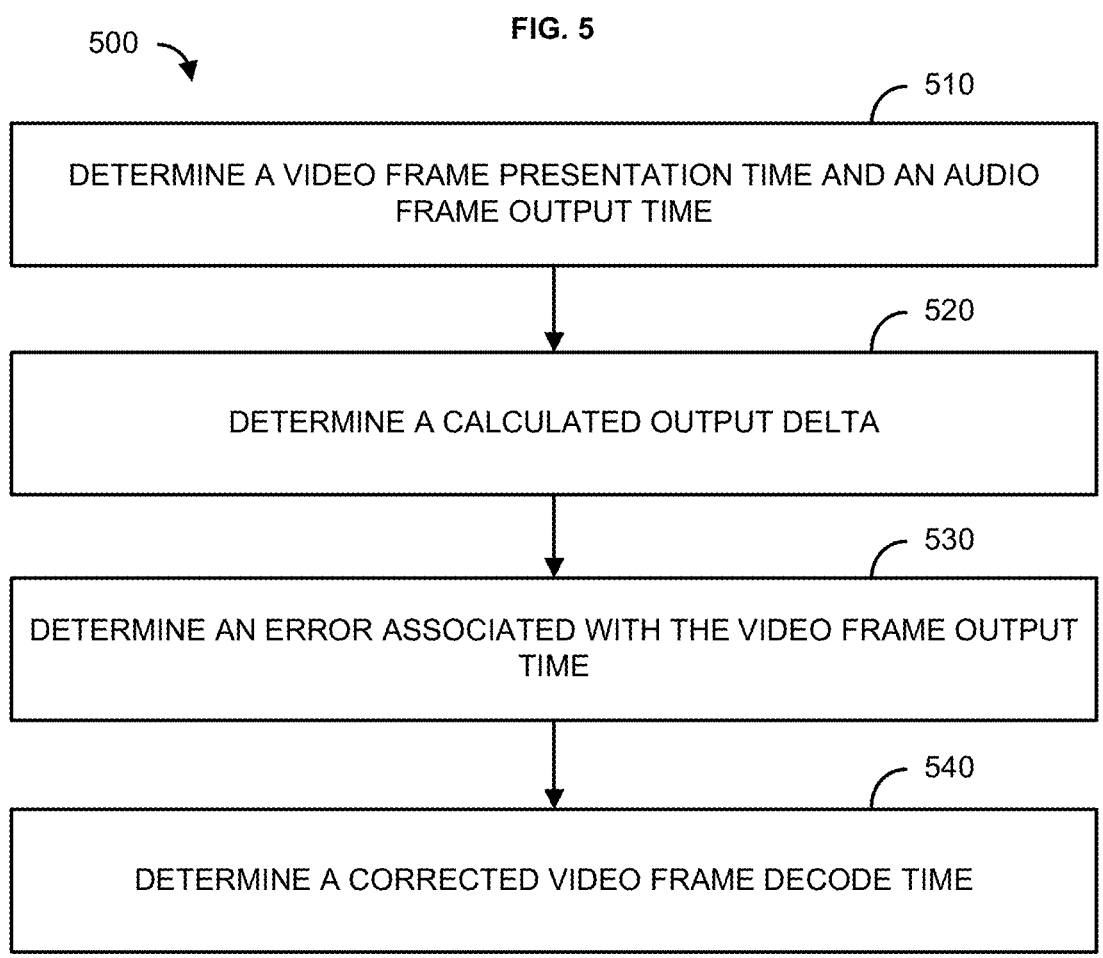
FIG. 5 shows a flowchart of an example method for content synchronization.

FIG. 5 shows a flowchart of an example method 500 for content synchronization. At step 510, a video frame output (e.g., presentation, display, delivery, etc.) time and an audio frame output (e.g., presentation, display, delivery, etc.) time may be determined. The video frame output time and the audio frame output time may be determined by a computing device (e.g., the application server 126, the content source 127, the edge device 128, the media device 120, the display 121, the communication terminal 122, and/or the mobile device 124 of FIG. 1). The video frame output time and the audio frame output time may be determined from metadata of a video frame and an audio frame. The video frame may have video frame metadata (e.g., the video frame identifier 208, the audio frame ID 210, the output time 212, the output delta 214, and the decode time 216 of FIG. 2). The audio frame may have audio frame metadata (e.g., the audio frame identifier 218, the video frame ID 220, the output time 222, the output delta 224, and the decode time 226 of FIG. 2). For example, the video frame may have an output time of 55.4 seconds. The video frame output may last from 55.4 seconds to 56 seconds. The audio frame may have an audio frame output time of 55.8 seconds, which occurs during the video frame output (e.g., between 55.4 seconds and 56 seconds).

At step 520, a calculated output (e.g., presentation, display, delivery, etc.) delta may be determined. The calculated output delta may be determined by the computing device. The calculated output delta may be determined based on the video frame output time and the audio frame output time. The calculated output delta may be a difference between the video frame output time and the audio frame output time. For example, the calculated output delta may be −0.4 based on the difference between the video frame output time of 55.4 seconds and the audio frame output time of 55.8 seconds.

At step 530, an error associated with the video frame output time may be determined. The error associated with the video frame output time may be determined by the computing device. The error may be determined based on a comparison between the calculated output delta and the output delta of the video frame (e.g., the output delta 214 of FIG. 2). The output delta may be determined at a time that the video frame is encoded, transcoded, re-multiplexed, or processed. The output delta may be determined from the metadata of the video frame. For example, the output delta of the video frame may indicate that the output delta is −0.5. The error associated with the video frame output time may be determine based on a difference between the calculated output delta and the output delta of the video frame satisfying a threshold. If the difference between the output delta of the video frame and the calculated output delta is zero, then there may be no error associated with the output time of the video frame. If the difference between the output delta of the video frame and the calculated output delta satisfies a threshold (e.g., is outside the threshold), there may be an error with the output time of the video frame (e.g., a synchronization error). The threshold may be whether the output delta of the video frame is outside a value (e.g., +/−1/(a video frame rate)) of the calculated output delta. For example, if the frame rate is 30 frames per second, the output delta of the video frame may need to be within +/−0.03 from the calculated output delta to indicate that there is not an error with the output time of the video frame (e.g., there is not a synchronization error). If the output delta of the video frame is outside of +/−0.03 from the calculated output delta, then there may be an error with the output time of the video frame (e.g., there is a synchronization error). The difference between the output delta of the video frame of −0.5 and the calculated output delta of −0.4 may be 0.1. Accordingly, based on the difference between the output delta of the video frame and the calculated output delta being more than +/−0.03 from each other, an error with the output time of the video frame may be determined. The difference between the output delta and the calculated output delta satisfying the threshold may indicate an error with the video frame output time. The error associated with the video frame output time may indicate a synchronization error between the video frame and the audio frame. The synchronization error may be a lip synchronization error between the video frame and the audio frame.

The error associated with the video frame output time may be corrected. The computing device may correct the error associated with the video frame output time. The computing device may correct the error associated with the video frame output time based on the audio frame output time. The error may be corrected based on determining the audio output time of the audio frame is correct. After the audio frame is determined to be correct, the output delta is subtracted from the audio output time to determine the correct video time. The video frame may be presented based on the corrected output time.

A verified audio frame output time may be determined. The verified audio frame output time may be determined based on an audio frame rate. The verified audio frame output time may be determined based on a previously occurring audio frame. The previously occurring audio frame may be an audio frame that immediately precedes the audio frame. The verified audio frame output time may be determined based on an output time in the previously occurring audio frame. The verified audio frame output time may be determine by adding a value of time to the output time of the previously occurring audio frame. The value of time added to the output time may be based on the audio frame rate that the audio frames are presented. The value of time added to the output time may be the reciprocal of the audio frame rate. The audio output time of the audio frame may be verified based on a previously occurring audio frame's output time and an audio frame rate. For example, if the frame rate is 30 frames per second, the audio output time of the audio frame may need to be 0.03 seconds after the audio output time of the previously occurring audio frame. If the previously occurring audio frame's time is 55.77 seconds and the frame rate is 30 frames per second, the audio frame output time may be verified as correct if the audio frame output time is 55.8 seconds. The corrected video frame output time may be determined based on the verified audio frame output time. The corrected video frame output time may be determined by subtracting the output delta from the verified audio frame output time. For example, the audio frame output time may be verified correct at 55.8 seconds. Subtracting the output delta of the video frame (e.g., 0.1) from the audio frame output time of 55.8 seconds may determine the correct video frame output time is 55.7 seconds. The video frame may be presented based on the corrected output time (e.g., at 55.7 seconds).

At step 540, a corrected video frame decode time may be determined. The corrected video frame decode time may be determined by the computing device. The corrected video frame decode time may be determined based on the corrected video frame output time and a video frame decode delay. A video frame decode time may be determined to have an error. The error in the video frame decode time may be determined based on the video frame output time having an error. That is, because the video frame output time had an error, the decode time may also have an error because the decode time is based on the video frame output time. The corrected video frame output time may be used to correct the video frame decode time. The video frame decode delay may be subtracted from the corrected video frame output time to determine the corrected video frame decode time. For example, the corrected video frame output time may be 55.7 seconds. The decode delay may be 0.5 seconds. Subtracting the decode delay from the corrected video frame output time may be 55.2 seconds. Thus, the corrected video frame decode time may be 55.2 seconds. The video frame decode time may indicate the time that the video frame needs to begin decoding in order to be presented on time.

Figure 6:
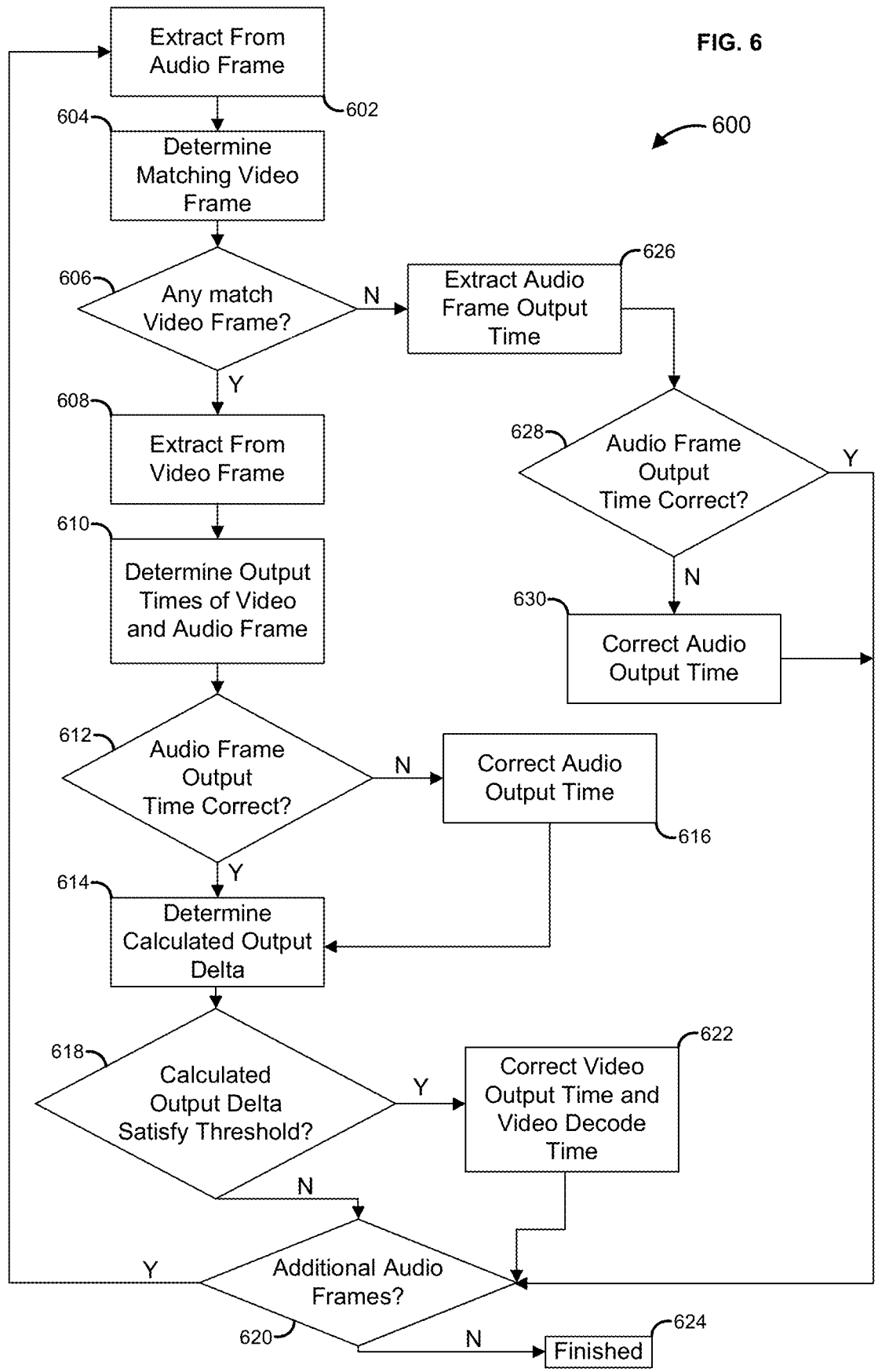
FIG. 6 shows a flowchart of an example method for content synchronization.

FIG. 6 shows a flowchart of an example method 600 for content synchronization. At step 602, data may be extracted from an audio frame (e.g., the audio frame 206 of FIG. 2). The data may be extracted from the audio frame by a computing device (e.g., the application server 126, the content source 127, the edge device 128, the media device 120, the display 121, the communication terminal 122, and/or the mobile device 124 of FIG. 1). The data may be metadata. The method 600 may be repeated. The method 600 may be repeated until all the audio frames and all the video frames of the content are determined to be correct.

At step 604, a matching video frame (e.g., the video frame 204 of FIG. 2) may be determined. The matching video frame may be determined by the computing device. The matching video frame may be determined based on the extracted metadata. The matching video frame may be determined based on a video frame ID (e.g., the video frame ID 220 of FIG. 2).

If a matching video frame is found at step 606, data may be extracted from the video frame at step 608. The data may be extracted from the video frame by the computing device. The data may be metadata.

At step 610, based on the extracted data, an output (e.g., presentation, display, delivery, etc.) time of the video frame (e.g., the output time 212 of FIG. 2) and an output (e.g., presentation, display, delivery, etc.) time of the audio frame (e.g., the output time 222 of FIG. 2) may be determined. The output time of the video frame may be determined from metadata extracted from the video frame. The output time of the audio frame may be determined from the metadata extracted from the video frame. The audio frame may be associated with the video frame. For example, the video frame may have an output time of 55.4 seconds. The video frame output may last from 55.4 seconds to 56 seconds. The audio frame may have an audio frame output time of 55.8 seconds, which occurs during the video frame output (e.g., between 55.4 seconds and 56 seconds).

At step 612, whether the audio frame output time is correct may be determined. The error associated with the audio frame output time may be determined by the computing device. The error may be determined based on a comparison between the audio output time and an audio output time of a previously occurring audio frame. If the difference between the two audio outputs time is greater than or less than the reciprocal of audio frame rate, there may be an error. The audio output time of the audio frame may be verified based on a previously occurring audio frame's output time and an audio frame rate. For example, if the frame rate is 30 frames per second, the audio output time of the audio frame may need to be 0.03 seconds after the audio output time of the previously occurring audio frame. If the previously occurring audio frame's time is 55.77 seconds and the frame rate is 30 frames per second, the audio frame output time may be verified as correct if the audio frame output time is 55.8 seconds.

If there is not an error with the audio frame output time, a calculated output (e.g., presentation, display, delivery, etc.) delta may be determined at step 614. The calculated output delta may be determined by the computing device. The calculated output delta may be determined based on the video frame output time and the audio frame output time. The calculated output delta may be a difference between the audio frame output time and the video frame output time. For example, the calculated output delta may be −0.4 based on the difference between the video frame output time of 55.4 seconds and the audio frame output time of 55.8 seconds If there is an error with the audio frame output time, a correct audio output (e.g., presentation, display, delivery, etc.) time may be determined at step 616. The error associated with the audio frame output time may be corrected. The computing device may correct the error associated with the audio frame output time. The error associated with the audio frame output time may be corrected based on a previously occurring audio frame's output time and an audio frame rate. The computing device may correct the error associated with the audio frame output time based on the video frame output time. The error may be corrected based on determining the video output time of the video frame is correct. After the video frame is determined to be correct, the video output time is added to the output delta to determine the correct audio time output time. The audio frame may be presented based on the corrected output time.

The corrected audio frame output time may be determined based on an audio frame rate. The corrected audio frame output time may be determined based on a previously occurring audio frame. The previously occurring audio frame may be an audio frame that immediately precedes the audio frame. The corrected audio frame output time may be determined based on an output time in the previously occurring audio frame. The corrected audio frame output time may be determined by adding a value of time to the output time of the previously occurring audio frame. The value of time added to the output time may be based on the audio frame rate that the audio frames are presented. The value of time added to the output time may be the reciprocal of the audio frame rate. For example, if the frame rate is 30 frames per second, the audio output time of the audio frame may need to be 0.03 seconds after the audio output time of the previously occurring audio frame. If the previously occurring audio frame's time is 55.77 seconds and the frame rate is 30 frames per second, the audio frame output time may be corrected to 55.8 seconds.

At step 618, whether the calculated output delta satisfies a threshold may be determined. The output delta satisfying the threshold may indicate that there is an error with the video frame output time. The output delta satisfying the threshold may indicate that there is an error with the video frame output time because the audio frame output time is not the source of the error based on the audio frame output time previously being corrected and/or verified. For example, the output delta of the video frame may indicate that the output delta is −0.5. If the difference between the output delta of the video frame and the calculated output delta is zero, then there may be no error associated with the output time of the video frame. If the difference between the output delta of the video frame and the calculated output delta satisfies a threshold (e.g., is outside the threshold), there may be an error with the output time of the video frame (e.g., a synchronization error). The threshold may be whether the output delta of the video frame is outside a value (e.g., +/−1/(a video frame rate)) of the calculated output delta. For example, if the frame rate is 30 frames per second, the output delta of the video frame may need to be within +/−0.03 from the calculated output delta to indicate that there is not an error with the output time of the video frame (e.g., there is not a synchronization error). If the output delta of the video frame is outside of +/−0.03 from the calculated output delta, then there may be an error with the output time of the video frame (e.g., there is a synchronization error). The difference between the output delta of −0.5 and the calculated output delta of −0.4 may be 0.1. Accordingly, based on the difference between the output delta and the calculated output delta being more than +/−0.03 from each other, an error with the output time of the video frame may be determined. The difference between the output delta of the video frame and the calculated output delta satisfying the threshold may indicate an error with the video frame output time.

If the threshold is not satisfied, additional audio frames may be determined at step 620. The additional audio frames may be the remaining audio frames in the content and could also indicate additional audio frames that are associated with the video frame determined in step 604. If there are additional audio frames, data may be extracted from the additional audio frames at step 602 described above. If there are no additional audio frames, the method may end at step 624.

If the threshold is satisfied, the video output time and the video decode time may be corrected at step 622. The error associated with the video frame output time may be corrected. The computing device may correct the error associated with the video frame output time. The computing device may correct the error associated with the video frame output time based on the audio frame output time. The error may be corrected based on determining the audio output time of the audio frame is correct. After the audio frame is determined to be correct, the output delta is subtracted from the audio output time to determine the correct video output time. The video frame may be presented based on the corrected output time. For example, the audio frame output time may be verified correct at 55.8 seconds. Subtracting the output delta (e.g., 0.1) from the audio frame output time of 55.8 seconds may determine the correct video frame output time is 55.7 seconds. The video frame may be presented based on the corrected output time (e.g., at 55.7 seconds).

A video frame decode time may be determined to have an error. The error in the video frame decode time may be determined based on the video frame output time having an error. That is, because the video frame output time had an error, the decode time may also have an error because the decode time is based on the video frame output time. The corrected video frame output time may be used to correct the video frame decode time. The video frame decode delay may be subtracted to the corrected video frame output time to determine the corrected video frame decode time. For example, the corrected video frame output time may be 55.7 seconds. The decode delay may be 0.5 seconds. Subtracting the decode delay from the corrected video frame output time may be 55.2 seconds. Thus, the corrected video frame decode time may be 55.2 seconds. The video frame decode time may indicate the time that the video frame needs to begin decoding in order to be presented on time.

Referring back to step 606 where determining if there may be any matching video frames associated with the audio frame, if there are none, the audio output time may be extracted from the audio frame at step 626. The audio output time may be extracted from metadata associated with the audio frame. The metadata associated with the audio frame may be encoded within the audio frame.

At step 628, determine whether the audio frame output time is correct. The audio frame output time may be verified based on an audio frame rate and a previously occurring audio frame. A verified audio frame output time may be determined by adding a value of time to the output time of the previously occurring audio frame based on an audio frame rate that the audio frames are presented. If the verified audio frame output time matches the audio frame output time, then the audio frame output time is correct and additional audio frames may be determined at step 620 described above. For example, the audio frame output time may be verified correct at 55.8 seconds. Subtracting the output delta (e.g., 0.1) from the audio frame output time of 55.8 seconds may determine the correct video frame output time is 55.7 seconds. The video frame may be presented based on the corrected output time (e.g., at 55.7 seconds).

If the audio frame output time is not correct, the audio output time may be corrected at step 630. The corrected audio frame output time may be determined based on an audio frame rate. The corrected audio frame output time may be determined based on a previously occurring audio frame. The previously occurring audio frame may be an audio frame that immediately precedes the audio frame. The corrected audio frame output time may be determined based on an output time in the previously occurring audio frame. The corrected audio frame output time may be determined by adding a value of time to the output time of the previously occurring audio frame. The value of time added to the output time may be based on the audio frame rate that the audio frames are presented. The value of time added to the output time may be the reciprocal of the audio frame rate. Once the audio output time is corrected, additional audio frames may be determined at step 620.

Figure 7:
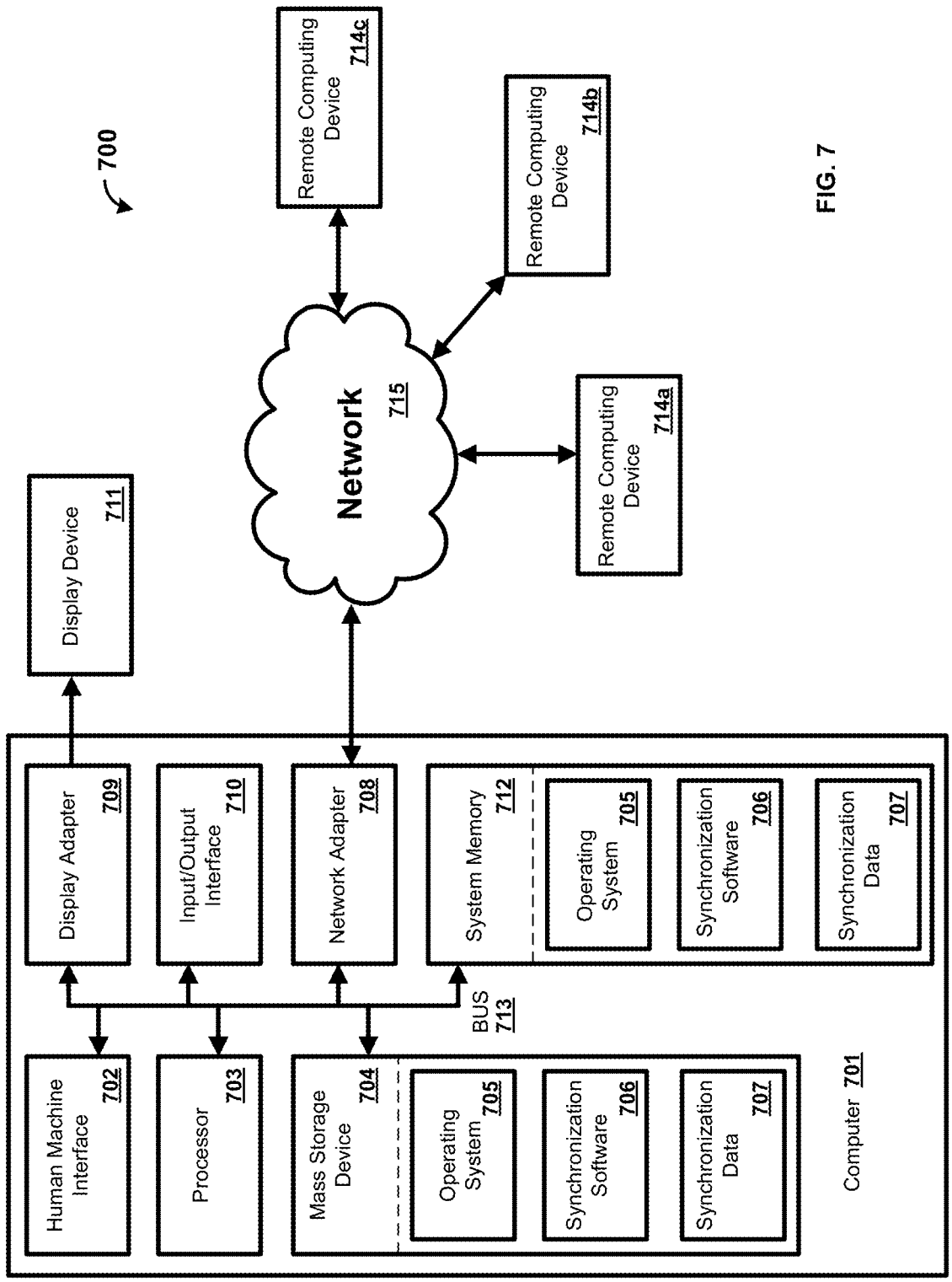
FIG. 7 shows a block diagram of a computing device.

FIG. 7 shows an example system 700 for synchronizing content. The server 110, the application server 126, the content source 127, or the edge device 128 of FIG. 1 may be a computer as shown in FIG. 7. The media device 120, the communication terminal 122, and/or the mobile device 124 of FIG. 1 may be a computer as shown in FIG. 7.

The computer 701 may comprise one or more processors 703, a system memory 712, and a bus 713 that couples various system components including the one or more processors 703 to the system memory 712. In the case of multiple processors 703, the computer 701 may utilize parallel computing.

The bus 713 is one or more of several possible types of bus structures, including a memory bus or memory controller, a peripheral bus, an accelerated graphics port, or local bus using any of a variety of bus architectures.

The computer 701 may operate on and/or comprise a variety of computer readable media (e.g., non-transitory). The readable media may be any available media that is accessible by the computer 701 and may include both volatile and non-volatile media, removable and non-removable media. The system memory 712 may have computer readable media in the form of volatile memory, such as random access memory (RAM), and/or non-volatile memory, such as read only memory (ROM). The system memory 712 may store data such as the synchronization data 707 and/or program modules such as the operating system 705 and the synchronization software 706 that are accessible to and/or are operated on by the one or more processors 703.

The computer 701 may also have other removable/non-removable, volatile/non-volatile computer storage media. FIG. 7 shows the mass storage device 704 which may provide non-volatile storage of computer code, computer readable instructions, data structures, program modules, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 704, such as the operating system 705 and the synchronization software 706. Each of the operating system 705 and the synchronization software 706 (or some combination thereof) may have elements of the program modules and the synchronization software 706. The synchronization data 707 may also be stored on the mass storage device 704. The synchronization data 707 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 715.

A user may enter commands and information into the computer 701 via an input device (not shown). The input device may be, but not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 703 via a human machine interface 702 that may be coupled to the bus 713, but may be connected by other interface and bus structures, such as a parallel port, game port, an IEEE 1394 Port (also known as a Firewire port), a serial port, network adapter 708, and/or a universal serial bus (USB).

The display device 711 may also be connected to the bus 713 via an interface, such as the display adapter 709. It is contemplated that the computer 701 may have more than one display adapter 709 and the computer 701 may have more than one display device 711. The display device 711 may be a monitor, an LCD (Liquid Crystal Display), light emitting diode (LED) display, television, smart lens, smart glass, and/or a projector. In addition to the display device 711, other output peripheral devices may be components such as speakers (not shown) and a printer (not shown) which may be connected to the computer 701 via the Input/Output Interface 710. Any step and/or result of the methods may be output (or caused to be output) in any form to an output device. Such output may be any form of visual representation, including, but not limited to, textual, graphical, animation, audio, tactile, and the like. The display device 711 and computer 701 may be part of one device, or separate devices.

The computer 701 may operate in a networked environment using logical connections to one or more remote computing devices 714a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 701 and a remote computing device 714a,b,c may be made via a network 715, such as a local area network (LAN) and/or a general wide area network (WAN). Such network connections may be through the network adapter 708. The network adapter 708 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components reside at various times in different storage components of the computing device 701, and are executed by the one or more processors 703 of the computer. An implementation of the synchronization software 706 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
    determining, by a computing device, a video frame output time associated with a video frame and an audio frame output time associated with an audio frame;
    determining, based on the video frame output time and the audio frame output time, a first calculated output delta; and
    determining, based on a difference between a first pre-set output delta, for the video frame and the audio frame, and the first calculated output delta satisfying a threshold, an error associated with at least one of the video frame output time or the audio frame output time.

2. The method of claim 1, wherein determining, based on the video frame output time and the audio frame output time, the first calculated output delta comprises determining, based on a difference between the video frame output time and the audio frame output time, the first calculated output delta.

3. The method of claim 1, further comprising receiving the video frame comprising video frame metadata, wherein the video frame output time and the audio frame output time are determined based on the video frame metadata.

4. The method of claim 1, further comprising receiving the audio frame comprising audio frame metadata, wherein the video frame output time and the audio frame output time are determined based on the audio frame metadata.

5. The method of claim 1, further comprising:
    correcting, based on the first pre-set output delta, the error associated with at least one of the video frame output time or the audio frame output time; and
    causing, based on the corrected error, output of at least one of the video frame or the audio frame.

6. An apparatus comprising:
    one or more processors; and
    memory storing processor-executable instructions that, when executed by the one or more processors, cause the apparatus to:
        determine a video frame output time associated with a video frame and an audio frame output time associated with an audio frame;
        determine, based on the video frame output time and the audio frame output time, a first calculated output delta; and
        determine, based on a difference between a first pre-set output delta, for the video frame and the audio frame, and the first calculated output delta satisfying a threshold, an error associated with at least one of the video frame output time or the audio frame output time.

7. The apparatus of claim 6, wherein the processor-executable instructions that, when executed by the one or more processors, cause the apparatus to determine, based on the video frame output time and the audio frame output time, the first calculated output delta, further cause the apparatus to determine, based on a difference between the video frame output time and the audio frame output time, the first calculated output delta.

8. The apparatus of claim 6, wherein the processor-executable instructions, when executed by the one or more processors, further cause the apparatus to receive the video frame comprising video frame metadata, and
    wherein the processor-executable instructions that, when executed by the one or more processors, cause the apparatus to determine the video frame output time and the audio frame output time, further cause the apparatus to determine, based on the video frame metadata, the video frame output time and the audio frame output time.

9. The apparatus of claim 6, wherein the processor-executable instructions, when executed by the one or more processors, further cause the apparatus to receive the audio frame comprising audio frame metadata, and wherein the processor-executable instructions that, when executed by the one or more processors, cause the apparatus to determine the video frame output time and the audio frame output time, further cause the apparatus to determine, based on the audio frame metadata, the video frame output time and the audio frame output time.

10. The apparatus of claim 6, wherein the processor-executable instructions, when executed by the one or more processors, further cause the apparatus to:

correct, based on the first pre-set output delta, the error associated with at least one of the video frame output time or the audio frame output time; and cause, based on the corrected error, output of at least one of the video frame or the audio frame.

11. One or more non-transitory computer-readable media storing processor-executable instructions that, when executed by at least one processor, cause the at least one processor to:

determine a video frame output time associated with a video frame and an audio frame output time associated with an audio frame;

determine, based on the video frame output time and the audio frame output time, a first calculated output delta; and determine, based on a difference between a first pre-set output delta, for the video frame and the audio frame, and the first calculated output delta satisfying a threshold, an error associated with at least one of the video frame output time or the audio frame output time.

12. The one or more non-transitory computer-readable media of claim 11, wherein the processor-executable instructions that, when executed by the at least one processor, cause the first calculated output delta to be determined based on the video frame output time and the audio frame output time, further cause the first calculated output delta to be determined based on a difference between the video frame output time and the audio frame output time.

13. The one or more non-transitory computer-readable media of claim 11, wherein the processor-executable instructions, when executed by the at least one processor, further cause the at least one processor to receive the video frame comprising video frame metadata, wherein the processor-executable instructions that, when executed by the at least one processor, cause the video frame output time and the audio frame output time to be determined, further cause the video frame output time and the audio frame output time to be determined based on the video frame metadata.

14. The one or more non-transitory computer-readable media of claim 11, wherein the processor-executable instructions, when executed by the at least one processor, further cause the at least one processor to receive the audio frame comprising audio frame metadata, wherein the processor-executable instructions that, when executed by the at least one processor, cause the video frame output time and the audio frame output time to be determined, further cause the video frame output time and the audio frame output time to be determined based on the audio frame metadata.

15. The one or more non-transitory computer-readable media of claim 11, wherein the processor-executable instructions, when executed by the at least one processor, further cause the at least one processor to:

correct, based on the first pre-set output delta, the error associated with at least one of the video frame output time or the audio frame output time; and cause, based on the corrected error, output of at least one of the video frame or the audio frame.

16. A system comprising:

a computing device configured to:
send at least one of a video frame or an audio frame; and a media device configured to:
receive the at least one of the video frame or the audio frame;
determine a video frame output time associated with the video frame and an audio frame output time associated with the audio frame;
determine, based on the video frame output time and the audio frame output time, a first calculated output delta; and
determine, based on a difference between a first pre-set output delta, for the video frame and the audio frame, and the first calculated output delta satisfying a threshold, an error associated with at least one of the video frame output time or the audio frame output time.

17. The system of claim 16, wherein the media device is configured to determine, based on the video frame output time and the audio frame output time, the first calculated output delta by the media device being configured to determine, based on a difference between the video frame output time and the audio frame output time, the first calculated output delta.

18. The system of claim 16, wherein the media device is configured to receive the at least one of the video frame or the audio frame by the media device being configured to receive the video frame comprising video frame metadata, wherein the video frame output time and the audio frame output time are determined based on the video frame metadata.

19. The system of claim 16, wherein the media device is configured to receive the at least one of the video frame or the audio frame by the media device being configured to receive the audio frame comprising audio frame metadata, wherein the video frame output time and the audio frame output time are determined based on the audio frame metadata.

20. The system of claim 16, wherein the media device is further configured to:

correct, based on the first pre-set output delta, the error associated with at least one of the video frame output time or the audio frame output time; and cause, based on the corrected error, output of at least one of the video frame or the audio frame.

21. The method of claim 1, further comprising:
determining a verified audio frame output time; and
determining, based on a difference between the first pre-set output delta and the verified audio frame output time, a corrected video frame output time.

22. The apparatus of claim 6, wherein the processor-executable instructions, when executed by the one or more processors, further cause the apparatus to:

determine a verified audio frame output time; and
determine, based on a difference between the first pre-set output delta and the verified audio frame output time, a corrected video frame output time.

23. The one or more non-transitory computer-readable media of claim 11, wherein the processor-executable instructions, when executed by the at least one processor, further cause the at least one processor to:
  determine a verified audio frame output time; and
  determine, based on a difference between the first pre-set output delta and the verified audio frame output time, a corrected video frame output time.

24. The system of claim 16, wherein the media device is further configured to:
  determine a verified audio frame output time; and
  determine, based on a difference between the first pre-set output delta and the verified audio frame output time, a corrected video frame output time.

25. The method of claim 1, wherein metadata associated with at least one of the video frame or the audio frame comprises data indicating the first pre-set output delta.

26. The apparatus of claim 6, wherein metadata associated with at least one of the video frame or the audio frame comprises data indicating the first pre-set output delta.

27. The one or more non-transitory computer-readable media of claim 11, wherein metadata associated with at least one of the video frame or the audio frame comprises data indicating the first pre-set output delta.

28. The system of claim 16, wherein metadata associated with at least one of the video frame or the audio frame comprises data indicating the first pre-set output delta.

\* \* \* \* \*